No. 789,647.     Patented May 9, 1905.

UNITED STATES PATENT OFFICE.

RICHARD ARENS, OF MARXLOH, GERMANY.

PROCESS OF MAKING DIBASIC CALCIUM PHOSPHATE.

SPECIFICATION forming part of Letters Patent No. 789,647, dated May 9, 1905.

Application filed November 7, 1903. Serial No. 180,202.

*To all whom it may concern:*

Be it known that I, RICHARD ARENS, a subject of the King of Prussia, German Emperor, residing at Marxloh, Rhineland, German Empire, have invented Improvements in the Process of Making Dibasic Calcium Phosphate, of which the following is a specification.

In treating calcium phosphate, especially phosphates of lime from bones, with sulfurous acid monobasic calcium phosphate is dissolved with formation of soluble acid calcium sulfite. In order to recover and separate from this solution the sulfurous acid, it has been proposed, as is well known, to heat this solution. If this heating operation is carried out, dibasic calcium phosphate and neutral calcium sulfite are precipitated, while one part of the sulfurous acid escapes, according to the following equation:

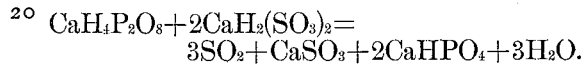
$$CaH_4P_2O_8 + 2CaH_2(SO_3)_2 = 3SO_2 + CaSO_3 + 2CaHPO_4 + 3H_2O.$$

The precipitated product is therefore of inferior quality by the amount of calcium sulfite. This disadvantage is particularly very inconvenient in employing the product as fodder or fertilizing substance. It is therefore of great interest to have this precipitate free from sulfurous acid. This may be obtained by treating the precipitate with mineral acids. However, in employing sulfuric acid the product would contain much calcium sulfate, and in employing hydrochloric acid or nitric acid the product would be dissolved. The employment of phosphoric acid would be too costly. According to my invention these drawbacks are avoided, and the said solution, containing substantially two molecules of calcium bisulfite and one molecule monobasic calcium phosphate, can fully be freed from the sulfurous acid if a second molecule or more or less monobasic calcium phosphate is added to the said solution. As the experiments have shown, thereby dibasic calcium phosphate is formed, while all sulfurous acid is set free according to the equation:

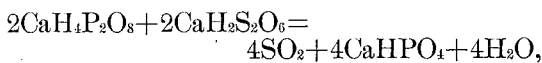
$$2CaH_4P_2O_8 + 2CaH_2S_2O_6 = 4SO_2 + 4CaHPO_4 + 4H_2O,$$

so that dibasic calcium phosphate free from calcium sulfite is obtained, as under the action of the second molecule of monobasic calcium phosphate neutral calcium sulfite cannot be formed, but is immediately decomposed. This decomposition, however, takes place only at a temperature of about 85° to 90° centigrade, according to the following equation:

$$CaSO_3 + CaH_4P_2O_8 = SO_2 + 2CaHPO_4 + H_2O.$$

The neutral sulfite of calcium ($CaSO_3$) is brought into this equation, since by the heating of the calcium-sulfite solution the neutral sulfite of calcium, which is insoluble in water, is formed by liberating and driving off, the sulfurous acid being combined with this neutral sulfite of calcium or monosulfite of calcium, thus holding in solution this monosulfite of calcium generally in the form of bisulfite of calcium. As soon as this monosulfite of calcium is formed, however, the same will be decomposed by the monocalcium phosphate present, according to this equation.

The process is preferably performed in the following manner: A solution of monobasic calcium phosphate is first produced by leaching superphosphate with water. This solution is then brought into suitable apparatus and heated to about 90° centigrade. Then the calcium-bisulfite solution containing the phosphate is caused to run permanently into the hot superphosphate solution, which is constantly heated. If the two solutions would be first mixed, a too-violent development of gas would enter. By the described operation this is avoided, and a continuous stream of sulfurous acid is obtained. The dibasic calcium phosphate is separated free from sulfurous acid. The escaping sulfurous-acid gas is collected and, if desired, dried and compressed in any suitable manner.

I claim as my invention—

1. The herein-described process of producing dibasic calcium phosphate from solutions of calcium bisulfite containing monobasic calcium phosphate, thereby recovering all the sulfurous acid, consisting in mixing the said solutions with a solution of monobasic calcium phosphate and heating the mixture.

2. The herein-described process of making dibasic calcium phosphate from solutions of calcium bisulfite containing monobasic calcium phosphate, thereby recovering all the sulfurous acid, consisting in heating a solution of monobasic calcium phosphate and adding thereto the said calcium-bisulfite solution containing monobasic calcium phosphate.

3. The herein-described process of producing dibasic calcium phosphate from solutions of calcium bisulfite, containing monobasic calcium phosphate, thereby recovering all the sulfurous acid, consisting in heating a solution of monobasic calcium phosphate to a temperature of about from 85° to 90° centigrade adding thereto the said calcium-bisulfite solution containing monobasic calcium phosphate and maintaining the heating.

In testimony whereof I have signed my name to this specification in the presence of two subscribing witnesses.

RICHARD ARENS.

Witnesses:
P. LIEBER,
WILLIAM ESSENWEIN,